(12) United States Patent
Hong

(10) Patent No.: US 8,154,889 B1
(45) Date of Patent: Apr. 10, 2012

(54) OPERATING MODE DETECTION IN A FLYBACK CONVERTER

(75) Inventor: Jye Sheng Hong, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/729,781

(22) Filed: Mar. 23, 2010

Related U.S. Application Data

(60) Provisional application No. 61/162,870, filed on Mar. 24, 2009.

(51) Int. Cl.
*H02M 3/335* (2006.01)

(52) U.S. Cl. .................................. 363/21.12; 363/21.06

(58) Field of Classification Search .................... 363/18, 363/21.12, 21.13, 21.14, 21.18, 21.06
See application file for complete search history.

(56) References Cited

U.S. PATENT DOCUMENTS

| 7,903,436 | B2 * | 3/2011 | Strijker | 363/21.14 |
| 2006/0013022 | A1 * | 1/2006 | Jitaru | 363/21.12 |
| 2009/0003019 | A1 * | 1/2009 | Yang | 363/21.06 |
| 2009/0231895 | A1 * | 9/2009 | Hu | 363/127 |
| 2009/0268494 | A1 * | 10/2009 | Hu | 363/89 |

* cited by examiner

*Primary Examiner* — Adolf Berhane
*Assistant Examiner* — Nguyen Tran

(57) ABSTRACT

Particular embodiments generally relate to detecting an operating mode of a flyback converter. In one embodiment, a voltage of a flyback converter is measured. A waveform for the voltage includes a first rate of change when the flyback converter is in a first mode of operation and a second rate of change when the flyback converter is in a second mode of operation. The presence of the first rate of change or the second rate of change is detected based on the waveform. The first mode of operation or the second mode of operation is determined depending on whether the first rate of change or the second rate of change is detected.

19 Claims, 7 Drawing Sheets

OPERATING MODE DETECTION IN A FLYBACK CONVERTER

CROSS REFERENCE TO RELATED APPLICATIONS

The present application claims priority to U.S. Provisional App. No. 61/162,870 for "A Method to Detect the Operating Mode (CCM, DCM or CrCM) in a Flyback Converter" filed Mar. 24, 2009, the contents of which is incorporated herein by reference in their entirety.

BACKGROUND

The present disclosure generally relates to operating mode detection in a flyback converter.

Unless otherwise indicated herein, the approaches described in this section are not prior art to the claims in this application and are not admitted to be prior art by inclusion in this section.

FIG. 1 depicts a circuit 100 for a conventional flyback converter. In operation, a switch, such as a metal oxide field effect transistor (MOSFET) 102, may be turned on to connect a primary coil (an inductor 104a) to an input voltage VDC. In this case, a flyback transformer 106 is charged. A power factor correction (PFC) block 108 may also be included to provide power factor correction. PFC block 108 may turn MOSFET 102 on and off.

When MOSFET 102 is on, flyback transformer 106 causes a positive voltage at Vsec− with respect to Vsec+. This and a positive VOUT voltage cause diode 110 to be reverse biased or blocked. In this case, a capacitor 112 supplies energy to a load at VOUT.

When MOSFET 102 is turned off, the lack of current path at the primary side causes VPRI− to be charged to a voltage larger than VDC. This causes Vsec− to flyback to a negative voltage, which turns on diode 110. The energy of flyback transformer 106 is transferred to the output of the flyback converter. That is, current from an inductor 104b flows to the load.

The voltage drop across diode 110 is around 0.6 volts. This voltage drop results in a loss of efficiency in circuit 100. A MOSFET may be included in parallel with diode 110 to reduce the efficiency loss.

FIG. 1B depicts a circuit 113 of another example of a conventional flyback converter. A MOSFET 114 is included in parallel with diode 110. Also, a synchronous rectifier controller 116 is included and turns on MOSFET 114 when diode 110 is conducting, which reduces the current and voltage across diode 110. If the voltage drops below forward bias threshold of diode 110, all current flows through MOSFET 114.

In some applications, the flyback converter may operate in both continuous current mode (CCM) and discontinuous current mode (DCM). Therefore, synchronous rectifier controller 116 needs to function in both modes. However, both of these modes have different conditions to satisfy as to when synchronous rectifier controller 116 should turned off MOSFET 114. Thus, synchronous rectifier controller 116 needs to detect which mode the flyback converter is operating in to determine how to operate.

As discussed above, there are different conditions to satisfy as to when MOSFET 114 should be turned off for both of the modes. For example, in the continuous current mode, MOSFET 114 should be off before MOSFET 102 is turned on to prevent any short circuit current. In the discontinuous current mode, MOSFET 114 should be turned off before the current changes direction to prevent draining the charge of capacitor 112.

Synchronous rectifier controller 116 may be designed with two separate circuits to detect the two modes of operation. Also, one circuit may be used to detect both modes of operation. However, even if one mode is detected, synchronous rectifier controller 116 needs to make sure those conditions for the other mode are not met. This complicates the design because the logic cannot simply assume that if one mode is detected, this is the actual mode being used. A test whether the other mode is not in fact the operating mode is also performed.

In one solution, a user may decide in advance which mode of operation the flyback converter will be operating in by adjusting an inductance value of flyback transformer 106 and choosing the correct conditions to use to turn MOSFET 114 on and off. However, the mode may change with the load and may not be pre-determined beforehand. Thus, synchronous rectifier controller 116 still needs to continuously detect for any change in operating mode.

SUMMARY

Particular embodiments generally relate to detecting an operating mode of a flyback converter. In one embodiment, a voltage of the flyback converter is measured. A waveform for the voltage includes a first rate of change when the flyback converter is in a first mode of operation and a second rate of change when the flyback converter is in a second mode of operation. The presence of the first rate of change or the second rate of change is detected based on the waveform. The first mode of operation or the second mode of operation is determined depending on whether the first rate of change or the second rate of change is detected.

In one embodiment, a method is provided that comprises: measuring a voltage of a flyback converter, wherein a waveform for the voltage includes a first rate of change when the flyback converter is in a first mode of operation and a second rate of change when the flyback converter is in a second mode of operation; determining if the first rate of change or the second rate of change is present based on the waveform; and determining whether the flyback converter is in the first mode of operation or the second mode of operation based on the presence of the first rate of change or the second rate of change.

In one embodiment, the method further comprises controlling a switch using different conditions based on whether the flyback converter is in the first mode of operation or the second mode of operation.

In one embodiment, the switch is opened upon detecting a first condition when the flyback converter is in the first mode of operation and the switch is opened upon detecting a second condition when the flyback converter is in the second mode of operation.

In one embodiment, determining whether the flyback converter is in the first mode of operation or the second mode of operation comprises: comparing the waveform to a first threshold to produce a first comparison waveform; comparing the waveform to a second threshold at a falling edge and a third threshold at a rising edge to produce a second comparison waveform; and analyzing the first comparison waveform and the second comparison waveform to determine if the flyback converter is operating in the first mode of operation or the second mode of operation.

In one embodiment, analyzing the first comparison waveform and the second comparison waveform comprises: determining a delay for the rising edge of the first comparison waveform with respect to the rising edge of the second comparison waveform; determining that the flyback converter is in the first mode of operation if the delay is above a value; and determining that the flyback converter is in the second mode of operation if the delay is below the value.

In another embodiment, a system is provided that comprises a flyback converter. The flyback converter comprises: a diode, and a switch coupled in parallel with the diode. A synchronous rectifier controller comprises logic configured to: measure a voltage of the flyback converter, wherein a waveform for the voltage includes a first rate of change when the flyback converter is in a first mode of operation and a second rate of change when the flyback converter is in a second mode of operation; determine if the first rate of change or the second rate of change is present based on the waveform; determine whether the flyback converter is in the first mode of operation or the second mode of operation based on the presence of the first rate of change or the second rate of change; and control the switch using different conditions based on whether the flyback converter is in the first mode of operation or the second mode of operation.

In one embodiment, the switch comprises a first switch. The flyback converter comprises: a first inductor; a second inductor coupled to the diode and switch; and a second switch coupled to the first inductor.

In one embodiment, the synchronous rectifier controller further comprises logic configured to open the switch upon detecting a first condition when the flyback converter is in the first mode of operation and open the switch upon detecting a second condition when the flyback converter is in the second mode of operation.

In one embodiment, the synchronous rectifier controller further comprises: a first comparator configured to compare the waveform to a first threshold to produce a first comparison waveform; a second comparator configured to compare the waveform to a second threshold at a falling edge and a third threshold at a rising edge to produce a second comparison waveform; and a mode detection block configured to analyze the first comparison waveform and the second comparison waveform to determine if the flyback converter is operating in the first mode of operation or the second mode of operation.

In one embodiment, the mode detection block is configured to: determine a delay for a first rising edge of the first comparison waveform with respect to a second rising edge of the second comparison waveform; determine that the flyback converter is in the first mode of operation if the delay is above a value; and determine that the flyback converter is in the second mode of operation if the delay is below the value.

The following detailed description and accompanying drawings provide a better understanding of the nature and advantages of the present invention.

DETAILED DESCRIPTION

Described herein are techniques for detecting an operating mode of a flyback converter. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Figure 1A:
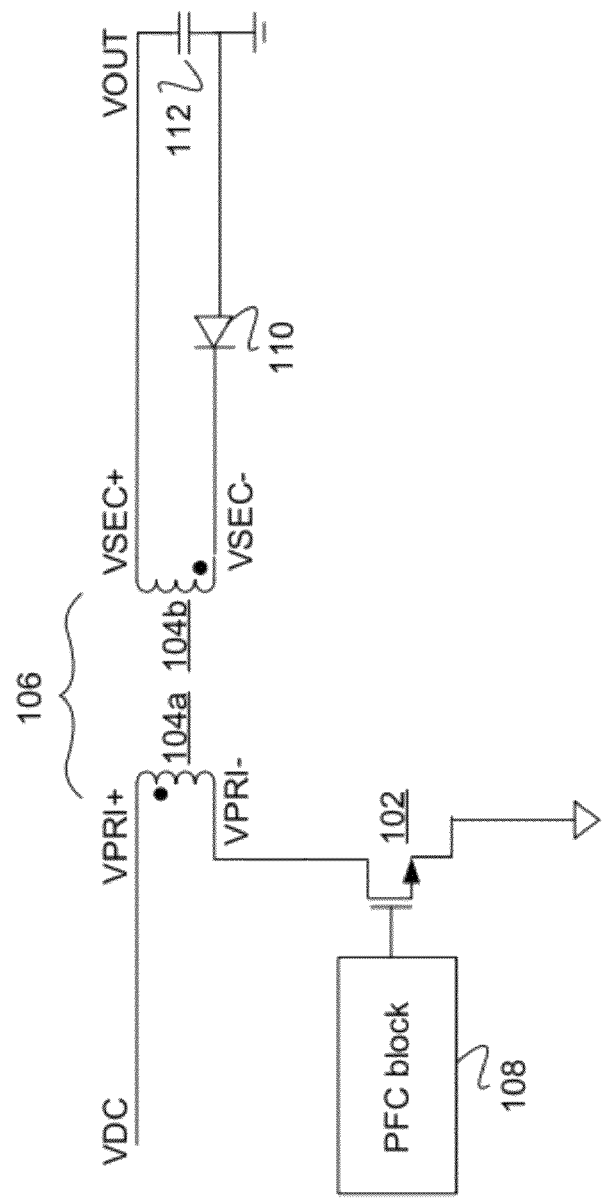
FIG. 1A depicts a circuit for a conventional flyback converter.
Figure 1B:
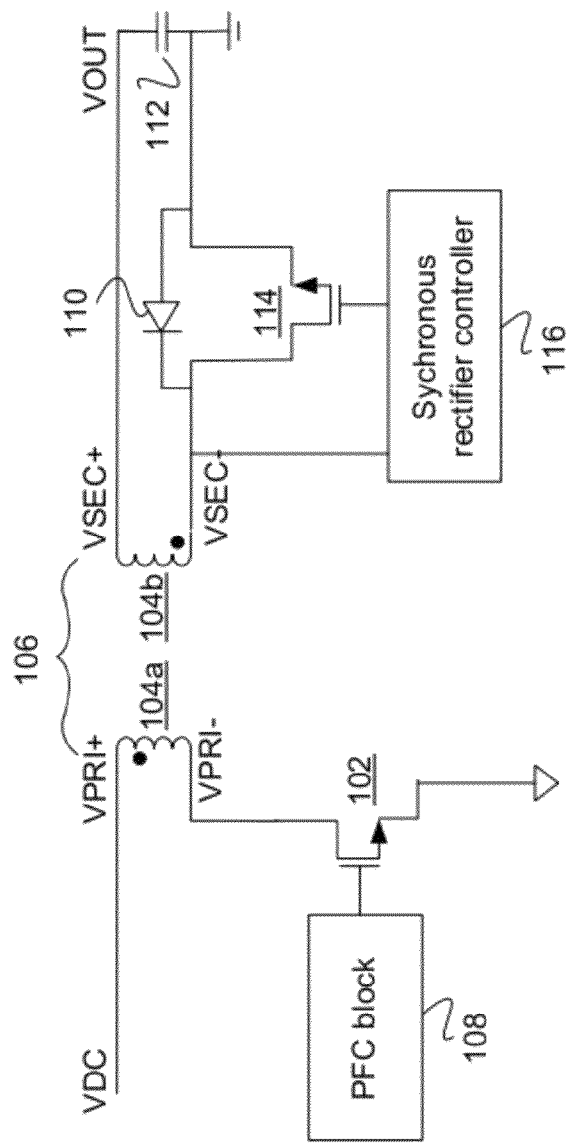
FIG. 1B depicts a circuit of another example a conventional flyback converter.
Figure 2:
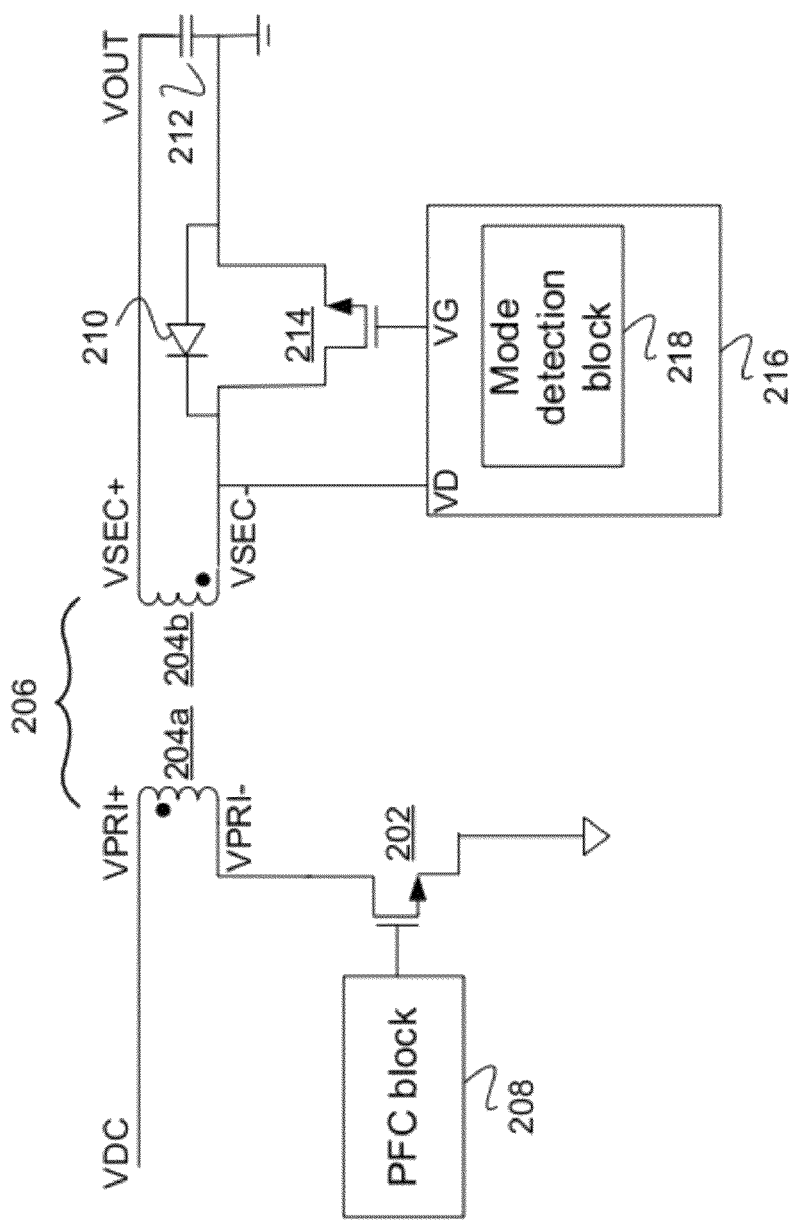
FIG. 2 depicts a circuit for a flyback converter according to one embodiment.

FIG. 2 depicts a circuit 200 for a flyback converter according to one embodiment. Circuit 200 may include a primary side that includes a metal oxide field effect transistor (MOSFET) 202, an inductor 204a, and a power factor correction (PFC) block 208. A secondary side includes an inductor 204b, a diode 210, a capacitor 112, a MOSFET 214, and a synchronous controller rectifier 216.

In operation, a switch, such as MOSFET 202, may be turned on to connect an inductor 204a (a primary coil) to an input voltage VDC. Although MOSFET 202 is described, it will be understood that other switches may be used. When MOSFET 202 is turned on, a flyback transformer 206 is charged. Power factor correction (PFC) block 208 may also be included to provide power factor correction. PFC block 208 may turn MOSFET 202 on and off.

When MOSFET 202 is on, flyback transformer 206 causes a positive voltage at Vsec− with respect to Vsec+. This and a positive VOUT voltage cause diode 210 to be reverse biased or blocked. In this case, capacitor 212 supplies energy to a load at VOUT.

When MOSFET 202 is turned off, the lack of current path cause VPRI− to be charged to a voltage larger than VDC. This causes Vsec− to flyback to a negative voltage, which turns on diode 210. The energy of transformer 206 is transferred to the output of the flyback converter. That is, current from an inductor 204b flows to the load. Synchronous rectifier controller 216 turns a switch, such as MOSFET 214, when diode 210 turns on. The above occurs for every cycle of turning MOSFET 202 on and off.

Synchronous rectifier controller 216 detects the voltage across diode 210 and determines when to turn MOSFET 214 on. The signal VD is used to represent the voltage across diode 210 and the signal VG is used to turn MOSFET 214 on and off. Although MOSFET 214 is described, other switches may be used. When diode 210 is on, MOSFET 214 is then turned on. Turning on MOSFET 214 decreases the voltage drop across diode 210, which increases the efficiency of the flyback converter.

In one embodiment, synchronous rectifier controller 216 includes a mode detection block 218 that detects which mode the flyback converter is operating in. Synchronous rectifier controller 216 turns MOSFET 214 on and off differently depending on the mode detected. In one example, a continuous current mode (CCM) or a discontinuous current mode (DCM) may be detected. Other modes may also be detected, such as critical conduction mode (CrCM).

The continuous current mode is where the current in inductor 204b does not decay to 0. There is a charging and discharging phase but there is always current or energy remaining in flyback transformer 206. In the discontinuous current mode, current in inductor 204b decays to 0 before a next cycle of turning on MOSFET 202 occurs. Thus, there will be a little time where there is no current in flyback transformer 206 (no current in either inductors 204a & 204b).

Mode detection block 218 is used to detect which mode the flyback converter is operating in. Depending on which mode is detected, synchronous rectifier controller 216 takes different actions. For example, in the continuous current mode, MOSFET 214 should be turned off before MOSFET 202 is turned on. If not, a short may be generated. In the discontinuous current mode, MOSFET 214 should be turned off when the current decays to 0. If MOSFET 214 is turned off after the current decays to 0 and changes direction, capacitor 212 will be discharged. Thus, MOSFET 214 may be turned off at different times in response to different conditions occurring in the flyback converter depending on the mode detected.

Mode detection block 218 uses a rate of change of the voltage Vsec− to determine which mode the flyback converter is operating in. The voltage Vsec− may be detected at VD. Although the rate of change of the voltage Vsec− is described, other voltages may be monitored. The rate of change of the voltage Vsec− is different for each mode. For example, the voltage Vsec− goes positive via a different mechanism for the discontinuous current mode and the continuous current mode. This causes the rate of change to be different for each mode.

Figure 3A:
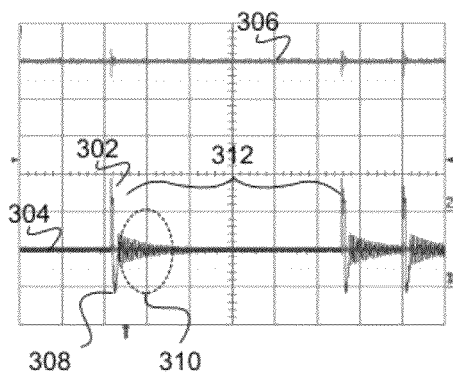
FIGS. 3A and 3B show voltage waveforms for a discontinuous current mode according to one embodiment.
Figure 3B:
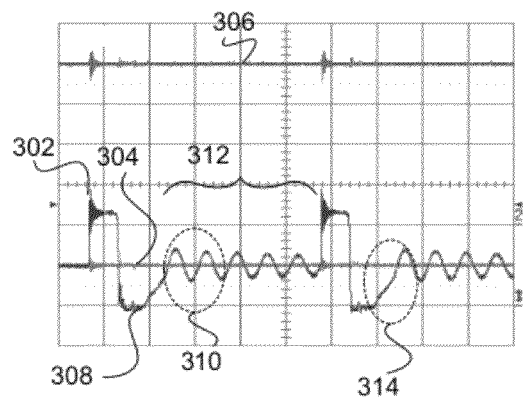

FIGS. 3A and 3B show voltage waveforms for a discontinuous current mode according to one embodiment. The voltage waveforms are for the flyback converter with only diode 210. The voltage waveforms for the flyback converter with MOSFET 214 are similar.

Referring to FIG. 3A, when MOSFET 202 is turned on and the primary side is on, the voltage Vsec− goes positive to cut off the current in the secondary side. That is, diode 210 is reverse biased and does not conduct current.

When MOSFET 202 turns off, the voltage Vsec− goes to a negative voltage to enable current to flow through diode 210 on the secondary side. This in turn charges capacitor 212. In the discontinuous current mode, the current on the secondary side decays to 0 before MOSFET 202 turns back on in the next cycle. When there is no current on the secondary side, diode 210 turns off and the voltage Vsec− goes positive and settles towards VOUT with a large ringing overshoot, which happens while MOSFET 202 is still off. In FIG. 3A, a voltage waveform 302 for Vsec− is shown with voltage waveforms 304 and 306 for the voltage Vsec+ and the voltage VOUT, respectively. When the current on the secondary side goes to 0 at a point 308, the voltage Vsec− goes positive. At 310, the large ringing overshoot is shown and at 312, the voltage Vsec− then settles towards the voltage VOUT.

FIG. 3B shows a zoomed-in version of waveforms 302, 304, and 306 according to one embodiment. As shown at 314, the rate of change of Vsec− is gradual after the current decays to zero. This rate of change will now be described with respect to the continuous current mode to show the differences in rates of change.

Figure 4A:
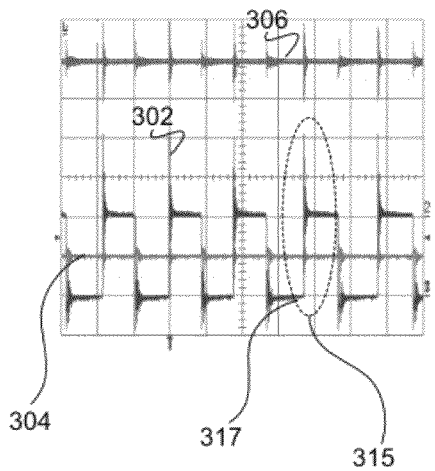
FIGS. 4A and 4B show voltage waveforms for a continuous current mode according to one embodiment.
Figure 4B:
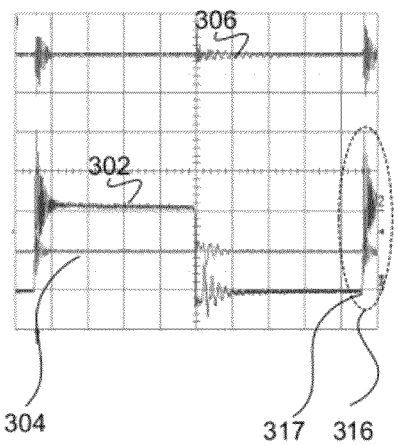

FIGS. 4A and 4B show voltage waveforms 302, 304, and 306 for the continuous current mode according to one embodiment. In the continuous current mode, the voltage Vsec− goes positive whenever MOSFET 202 is on. Also, Vsec− switches to a negative voltage when MOSFET 202 is off. In the continuous current mode, the current through the secondary side does not decay to 0 right before MOSFET 202 switches on. Instead, when MOSFET 202 turns on, the voltage Vsec− goes positive immediately, which turns off diode 210. Also, the voltage Vsec− does not oscillate around the output voltage VOUT because the current does not decay to 0 as was the case in the discontinuous current mode. Referring to FIG. 4A, at 317, MOSFET 202 is turned on. When this occurs, voltage waveform 302 for Vsec− goes positive immediately and settles around VOUT+VDC*N volts at 315 where (1:N) is the turn ratio between the primary coil and the secondary coil. As can be seen in FIG. 4B at 316, the rate of change of waveform 302 is high when voltage waveform 302 goes high. Thus, the rate of change of waveform 302 is faster when MOSFET 202 is turned on in the continuous current mode when compared with the rate of change of waveform 302 in the discontinuous current mode when the current through diode 210 decays to zero.

Accordingly, the conditions when the voltage Vsec− goes positive are different for the discontinuous current mode and the continuous current mode. The different conditions cause different rates of change for the voltage waveforms of the voltage Vsec−. The rate of change of the voltage Vsec− in the continuous current mode is much higher when compared with the rate of change of the voltage Vsec− for the discontinuous current mode.

Figure 5:
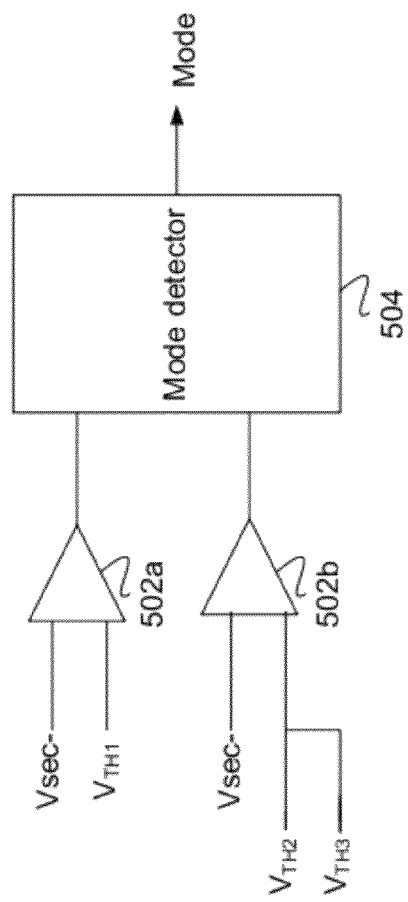
FIG. 5 depicts an example of a mode detection block according to one embodiment.

Mode detection block 218 monitors the rate of change of the voltage Vsec− and determines the operational mode of the flyback converter based on the rate of change. Different implementations may be used to detect the rate of change and determine the operating mode that corresponds to the rate of change. FIG. 5 depicts an example of mode detection block 218 showing one method to detect the rate of change according to one embodiment. Although this implementation is described, other implementations may be used.

Comparators 502a and 502b are used to compare Vsec− of waveform 302 to different threshold values. For example, comparator 502a compares Vsec− to a first reference voltage $V_{TH1}$. Comparator 502a may only use a time hysteresis to prevent comparator output jitters to the large ringing overshoot. Comparator 502b compares Vsec− to two different reference voltages $V_{TH2}$ and $V_{TH3}$. Comparator 502b may have voltage and time hysteresis. The reference voltage $V_{TH2}$ is compared to Vsec− to detect the falling edge of Vsec− and the reference voltage $V_{TH3}$ is compared to Vsec− to detect the rising edge of Vsec−.

Figure 6A:
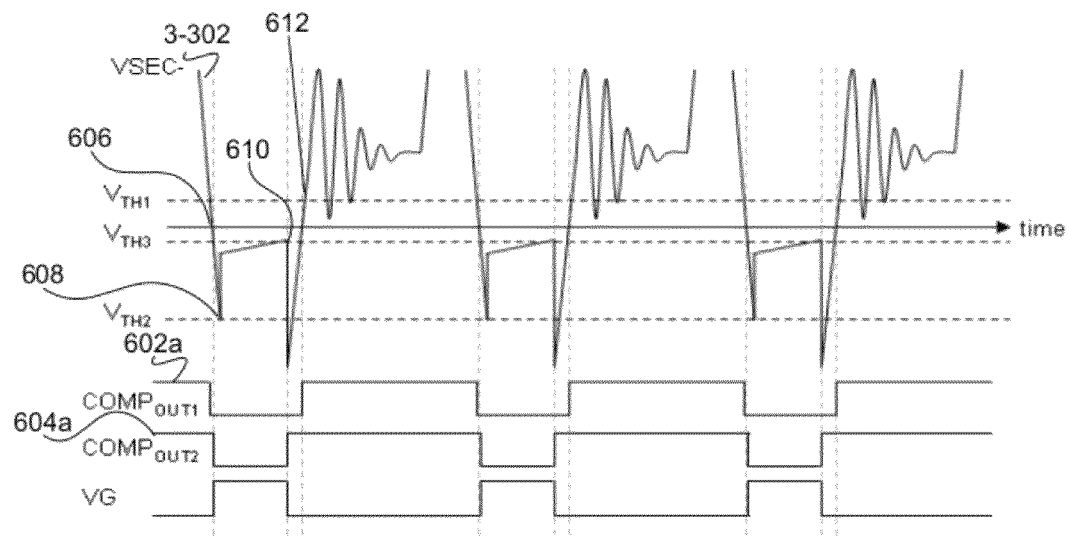
FIG. 6A shows outputs of comparators for the discontinuous current mode according to one embodiment.
Figure 6B:
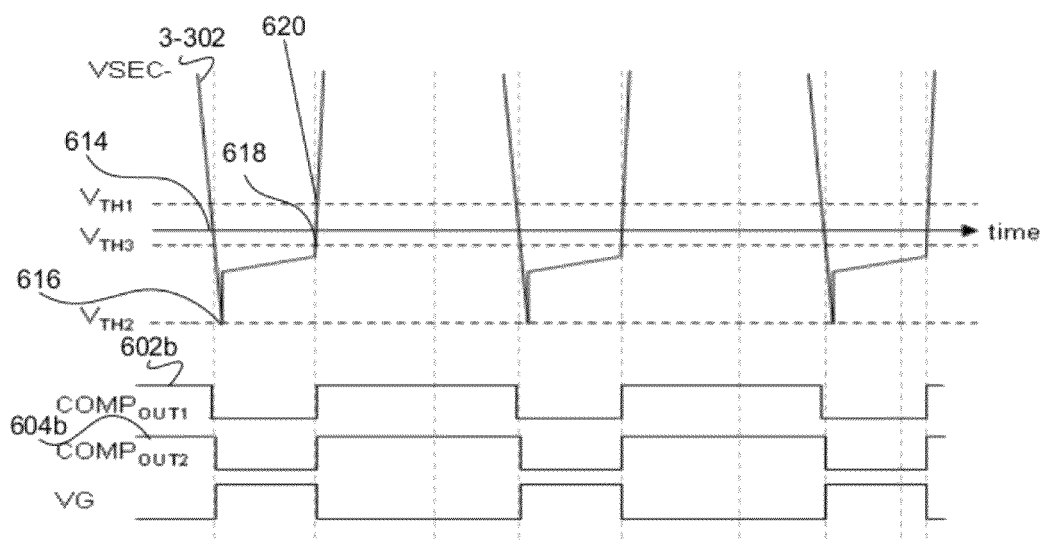
FIG. 6B shows outputs of comparators for the continuous current mode according to one embodiment.

A mode detector 504 includes logic to determine which mode the flyback converter is operating in based on the outputs of comparators 502a and 502b. FIG. 6A shows the outputs of comparators 502a and 502b when the flyback converter is operating in the discontinuous current mode according to one embodiment. Also, FIG. 6B shows the outputs of comparators 502a and 502b when the flyback converter is operating in the continuous current mode according to one embodiment.

Referring to FIG. 6A, waveform 3-302 is a zoomed in version of the voltage Vsec− according to one embodiment. Also, the levels of the three thresholds $V_{TH1}$, $V_{TH2}$, and $V_{TH3}$ are shown. The thresholds may be different reference voltages. A waveform 602a shows the output of comparator 502a ($COMP_{OUT1}$). Also, a waveform 604a shows the output of comparator 502b ($COMP_{OUT2}$).

Comparator 502a uses the threshold $V_{TH1}$ as a reference. As shown, when waveform 3-302 goes below $V_{TH1}$ at 606, $COMP_{OUT1}$ 602a falls. When waveform 3-302 goes further below $V_{TH2}$ at 608, $COMP_{OUT2}$ 604a falls. This signal is used to indicate the diode 210 is conducting which prompts the synchronous rectifier controller 216 to pull VG high. VG is the switching signal that controls MOSFET 214. When VG is high, MOSFET 214 is on. At this point, the threshold of comparator 502b threshold is switched to $V_{TH3}$, making it ready to detect the next rising edge of waveform 3-302.

At 610, waveform 3-302 goes above $V_{TH3}$ and the output of comparator 502b rises. This signal is used to indicate the current has decayed close to 0, which prompts synchronous rectifier controller 216 to pull VG low. When VG is low, MOSFET 214 is off. The small remaining current will continue to flow through diode 210. After a short period of time and when diode 210 turns off, waveform 3-302 rises above $V_{TH1}$ at 612. The output of comparator 502a thus rises at this point. As can be seen from 610 to 612, a slight delay in the rising edge of waveforms 602a and 604a occurs for comparators 502a and 502b. This slight delay will be used to determine which mode the flyback converter is operating in as will be described later after the continuous current mode is described.

Referring to FIG. 6B, the outputs of comparators 502a and 502b are shown for the continuous current mode. At 614, waveform 3-302 goes below the reference voltage $V_{TH1}$. When waveform 3-302 goes below $V_{TH1}$, $COMP_{OUT1}$ 602b falls. When waveform 3-302 goes further below $V_{TH2}$ at 616, $COMP_{OUT2}$ 604b falls. This signal is used to indicate the diode 210 is conducting which prompts synchronous rectifier controller 216 to pull VG high. VG is the switching signal that controls MOSFET 214. When VG is high, MOSFET 214 is on. At this point, the threshold of comparator 502b threshold is switched to $V_{TH3}$, making it ready to detect the next rising edge of waveform 3-302.

On the rising edge, the reference voltage $V_{TH3}$ is used for comparator 502b. At 618, waveform 3-302 goes above the reference voltage $V_{TH3}$ and the output of comparator 502b rises. Also, at 620, Vsec– goes above the reference voltage $V_{TH1}$ and the output of comparator 502a rises. As can be seen, waveform 3-302 rises very quickly between 618 and 620. That is, the slope of Vsec– rises very fast as shown in FIG. 4B. Waveform 3-302 rises very quickly because it is the result of the turning on of MOSFET 202. Turning on MOSFET 202 causes VPRI– to be pulled low quickly, which in turn results in VSEC– to fly high quickly as well Thus, the rising edge of waveforms 602b and 604b are very close to one another in the continuous current mode. In contrast, a delay in discontinuous current mode in the rising edge of the outputs of comparator 502a and 502b is larger than the delay when in the continuous current mode.

The longer delay results in the discontinuous mode because the threshold $V_{TH3}$ may be designed at a reference voltage slightly below 0 and the fact that the slope of waveform 3-302 is gradual in the discontinuous current mode as shown in FIG. 3B. However, the delay in rising edges of waveforms 602a and 602b is smaller when in the continuous current mode because of the high rate of change of waveform 3-302 when operating in the continuous current mode. That is, waveform 3-302 goes past the references voltages $V_{TH3}$ and $V_{TH1}$ at relatively the same time due to the high rate of change of waveform 3-302. However, because of the gradual rate of change of waveform 3-302 in the discontinuous current mode, there is a delay from when Vsec– goes past the threshold $V_{TH3}$ to when it goes past the threshold $V_{TH1}$.

Mode detector 504 receives the outputs of comparator 502a and 502b and determines the mode the flyback converter is operating in. For example, the delay between the rising edges of waveforms 602 and 604 is compared with a threshold to determine the mode. For example, the discontinuous current mode is determined when a delay longer than a certain time in the rising edges of waveforms 602a and 604a is determined.

Depending on the different mode detected, synchronous rectifier controller 216 may operate differently. For example, MOSFET 214 may be turned off differently. If the discontinuous current mode is determined, then MOSFET 214 is turned off when the current decays to 0. However, in the continuous current mode, MOSFET 214 should be turned off before MOSFET 202 is turned on.

Figure 7:
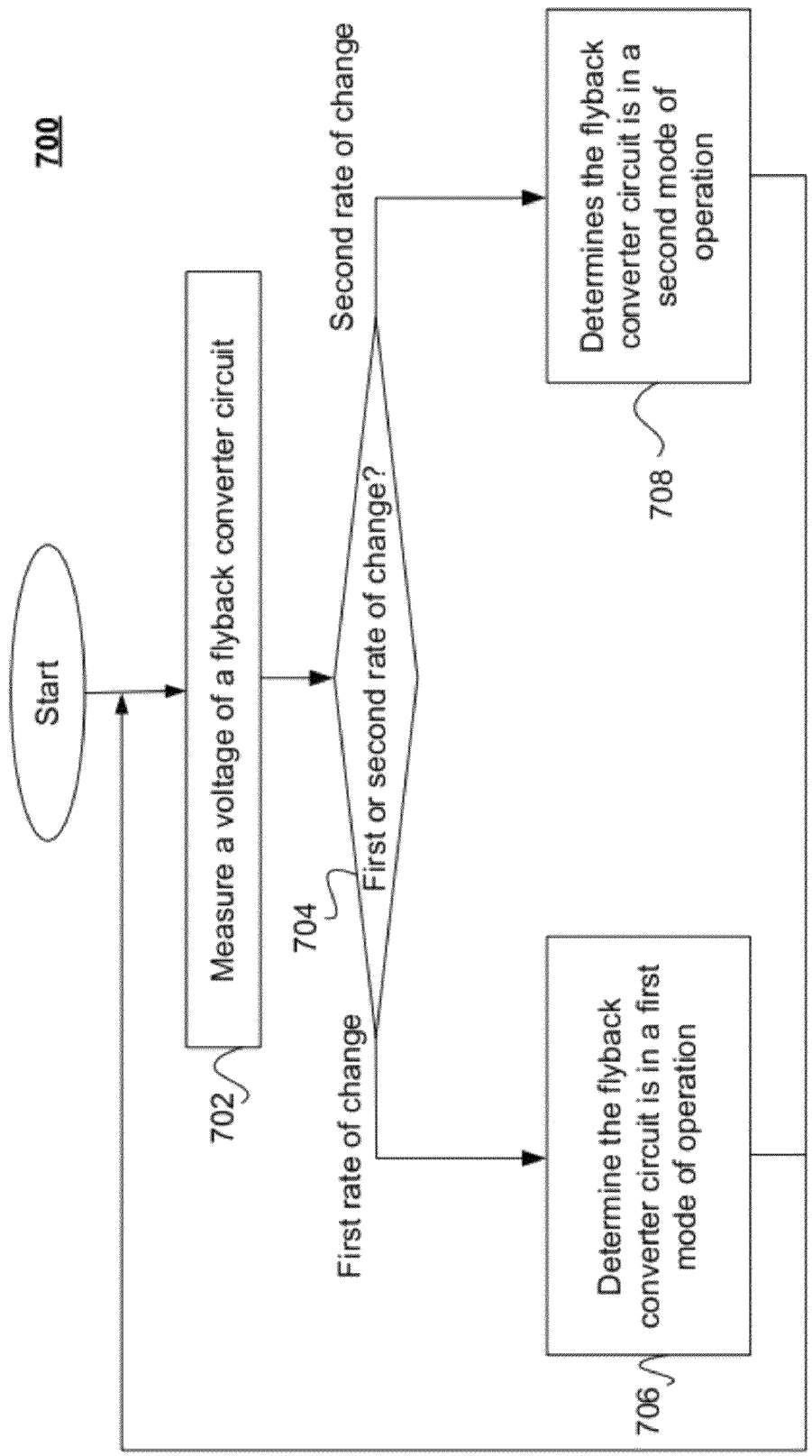
FIG. 7 depicts a simplified flowchart of a method for detecting an operating mode of a flyback converter according to one embodiment.

FIG. 7 depicts a simplified flowchart 700 of a method for detecting an operating mode of a flyback converter according to one embodiment. At 702, mode detection block 218 measures a voltage of the flyback converter. At 704, mode detection block 218 determines whether a waveform for the voltage includes a first rate of change or a second rate of change.

At 706, if the first rate of change is detected, mode detection block 218 determines that the flyback converter is in a first mode of operation. At 708, if the second rate of change is detected, mode detection block 218 determines that the flyback converter circuit is in a second mode of operation. This information may be used to determine when to switch off MOSFET 214 in the next charging and discharging cycle of flyback transformer 206.

The measurement process described at 702 and the detection process described at 704 is repeated at every charging and discharging cycle to detect any changes in the operation mode due to load changes or input voltage (VDC) changes.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method comprising:
measuring a voltage of a flyback converter, wherein a waveform for the voltage includes a first rate of change when the flyback converter is in a first mode of operation and a second rate of change when the flyback converter is in a second mode of operation;
analyzing the waveform for the voltage at multiple points in time to determine a delay in the waveform in crossing a first threshold and a second threshold;
determining if the first rate of change or the second rate of change is present based on the delay in the waveform, wherein determining if the first rate of change or the second rate of change is present comprises:
comparing the delay to a value;
if the delay is below the value, determining the flyback converter is in the first mode of operation; and
if the delay is above the value, determining the flyback converter is in the second mode of operation;
determining whether the flyback converter is in the first mode of operation or the second mode of operation based on the presence of the first rate of change or the second rate of change; and controlling a switch coupled to a diode using different conditions based on whether the flyback converter is in the first mode of operation or the second mode of operation.

2. The method of claim 1, wherein the voltage is measured at a winding of a secondary inductor of a flyback transformer in the flyback converter.

3. The method of claim 1, wherein the switch is opened upon detecting a first condition when the flyback converter is in the first mode of operation and the switch is opened upon detecting a second condition when the flyback converter is in the second mode of operation.

4. The method of claim 3, wherein the first condition is when current in a secondary inductor of a flyback transformer in the flyback converter goes to 0.

5. The method of claim 4, wherein the second condition is before a primary switch is turned on.

6. The method of claim 1, wherein the switch comprises a MOSFET.

7. A method comprising:
measuring a voltage of a flyback converter, wherein a waveform for the voltage includes a first rate of change when the flyback converter is in a first mode of operation and a second rate of change when the flyback converter is in a second mode of operation;
determining if the first rate of change or the second rate of change is present based on the waveform; and
determining whether the flyback converter is in the first mode of operation or the second mode of operation based on the presence of the first rate of change or the second rate of change, wherein determining whether the flyback converter is in the first mode of operation or the second mode of operation comprises:
comparing the waveform to a first threshold to produce a first comparison waveform;
comparing the waveform to a second threshold at a falling edge and a third threshold at a rising edge to produce a second comparison waveform; and
analyzing the first comparison waveform and the second comparison waveform to determine if the flyback converter is operating in the first mode of operation or the second mode of operation.

8. The method of claim 7, wherein analyzing comprises:
determining a delay for a first rising edge of the first comparison waveform with respect to a second rising edge of the second comparison waveform;
determining that the flyback converter is in the first mode of operation if the delay is above a value; and
determining that the flyback converter is in the second mode of operation if the delay is below the value.

9. The method of claim 7, wherein:
the first threshold is a first reference voltage,
the second threshold is a second reference voltage, and
the third threshold is a third reference voltage,
wherein:
the first reference voltage is above the third reference voltage, and
the third reference voltage is above the second reference voltage.

10. An apparatus comprising logic configured to perform the method of claim 1.

11. A system comprising:
a flyback converter comprising:
a diode, and
a switch coupled in parallel with the diode;
a synchronous rectifier controller comprising logic configured to:

measure a voltage of the flyback converter, wherein a waveform for the voltage includes a first rate of change when the flyback converter is in a first mode of operation and a second rate of change when the flyback converter is in a second mode of operation;
analyze the waveform for the voltage at multiple points in time to determine a delay in the waveform in crossing a first threshold and a second threshold;
determine if the first rate of change or the second rate of change is present based on the delay in the waveform wherein determine if the first rate of change or the second rate of change is present comprises:
compare the delay to a value;
if the delay is below the value, determine the flyback converter is in the first mode of operation; and
if the delay is above the value, determine the flyback converter is in the second mode of operation;
determine whether the flyback converter is in the first mode of operation or the second mode of operation based on the presence of the first rate of change or the second rate of change; and
control the switch using different conditions based on whether the flyback converter is in the first mode of operation or the second mode of operation.

12. The system of claim 11, wherein the switch comprises a first switch, wherein the flyback converter comprises:
a first inductor;
a second inductor coupled to the diode and first switch; and
a second switch coupled to the first inductor.

13. The system of claim 12, wherein the voltage is measured at a winding of the second inductor of a flyback transformer of the flyback converter.

14. The system of claim 12, wherein the synchronous rectifier controller further comprises logic configured to open the switch upon detecting a first condition when the flyback converter is in the first mode of operation and open the switch upon detecting a second condition when the flyback converter is in the second mode of operation.

15. The system of claim 14, wherein the first condition is when current in a secondary inductor of a flyback transformer in the flyback converter goes to 0.

16. The system of claim 15, wherein the second condition is before a primary switch is turned on.

17. The system of claim 11, wherein the switch comprises a MOSFET.

18. A system comprising:
a flyback converter comprising:
a diode, and
a switch coupled in parallel with the diode;
a synchronous rectifier controller comprising logic configured to:
measure a voltage of the flyback converter, wherein a waveform for the voltage includes a first rate of change when the flyback converter is in a first mode of operation and a second rate of change when the flyback converter is in a second mode of operation;
determine if the first rate of change or the second rate of change is present based on the waveform;
determine whether the flyback converter is in the first mode of operation or the second mode of operation based on the presence of the first rate of change or the second rate of change; and
control the switch using different conditions based on whether the flyback converter is in the first mode of operation or the second mode of operation, wherein the synchronous rectifier controller further comprises:

a first comparator configured to compare the waveform to a first threshold to produce a first comparison waveform;

a second comparator configured to compare the waveform to a second threshold at a falling edge and a third threshold at a rising edge to produce a second comparison waveform; and a mode detection block configured to analyze the first comparison waveform and the second comparison waveform to determine if the flyback converter is operating in the first mode of operation or the second mode of operation.

19. The system of claim 18, wherein the mode detection block is configured to:
  determine a delay for a first rising edge of the first comparison waveform with respect to a second rising edge of the second comparison waveform;
  determine that the flyback converter is in the first mode of operation if the delay is above a value; and
  determine that the flyback converter is in the second mode of operation if the delay is below the value.

* * * * *